Oct. 8, 1946.   V. A. HOOVER   2,408,854
STATOR FOR ELECTRIC MACHINES
Filed Nov. 6, 1943

Inventor
Vaino A. Hoover
By

Patented Oct. 8, 1946

2,408,854

UNITED STATES PATENT OFFICE 2,408,854

STATOR FOR ELECTRIC MACHINES

Vaino A. Hoover, Los Angeles, Calif., assignor to Electrical Engineering and Manufacturing Corporation, Los Angeles, Calif., a corporation of California Application November 6, 1943, Serial No. 509,292

3 Claims. (Cl. 172—36)

1

This invention has to do with dynamo-electric machines and, more particularly, with the stator part of such machines.

Electric machines, such as motors, which are to be used in aircraft and similar uses must occupy minimum space and be of minimum weight. Heretofore, motors for such uses have been designed in accordance with conventional practice, saving in weight being usually achieved by the use of light materials, where possible, and by the removal of material not required for structural reasons, and saving in space being usually achieved by reduction of power output.

The principal object of my invention has been to provide an electric machine, such as a motor, of minimum weight and volume which will produce the power of larger and heavier motors. In providing such a motor I have invented a new stator construction which is disclosed and claimed in this application, in which all space is utilized to the greatest possible extent, whereby a lighter and smaller motor of usual power output is provided. A further object has been to provide a motor having a new and improved pole and winding structure which, again, permits maximum utilization of space. A still further object has been to provide new and improved cooling means for the stator of a motor which will be provided by positive means instead of by the usual openings in the stator due to the difference in size between the coils and the pole pieces thereof.

Other objects and features of novelty of the invention will be made apparent by the following description and the annexed drawing which, it will be understood, is only illustrative of the invention and imposes no limitation thereon not imposed by the annexed claims.

Figure 1:
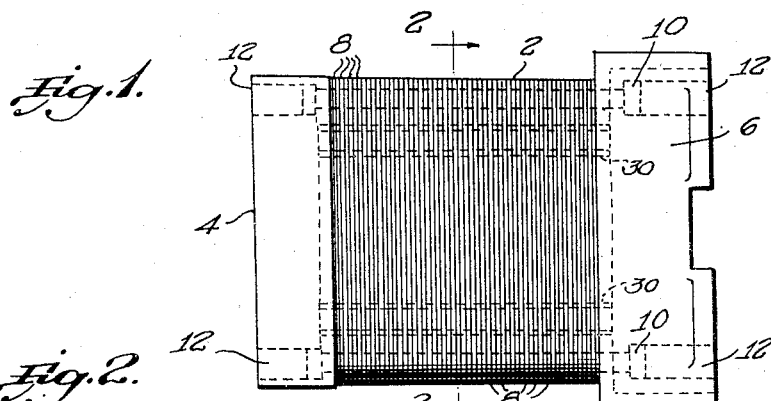
Figure 2:
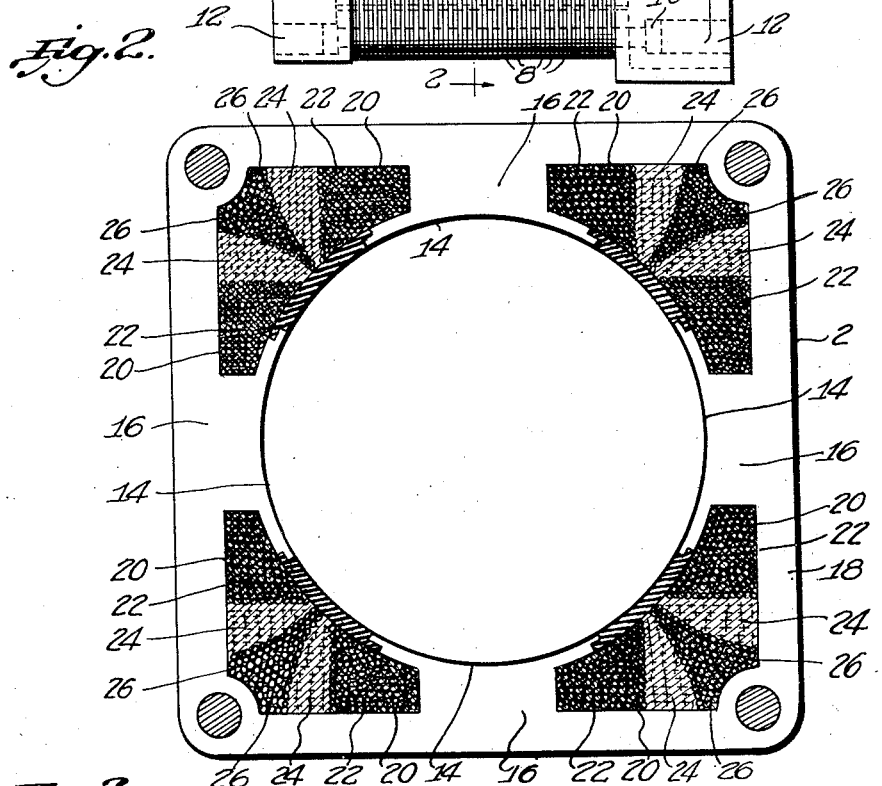
Figure 3:
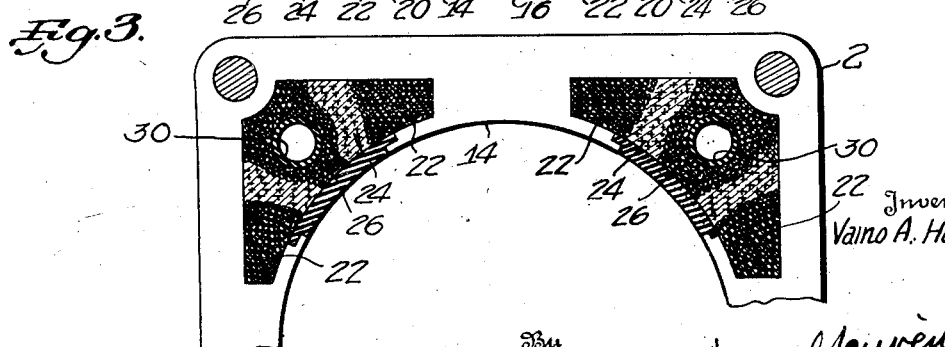

Referring to the drawing, in which similar reference numerals refer to like parts, Fig. 1 is a side view of a stator formed according to my invention;

Fig. 2 is an enlarged sectional view taken on line 2—2 of Fig. 1 and showing the positioning of the windings prior to positioning of the ventilating tubes, and Fig. 3 is a view which is similar to Fig. 2 and shows the windings and ventilating tubes in place.

In Figs. 1 and 2 of the drawing there is disclosed a stator for electric machines, such as motors, which is constructed in accordance with my invention. This stator comprises a central or pole part 2, an end part 4 to which a bearing supporting end bell and brush assembly may be attached, and an end part 6 to which a clutch housing may be attached. The central part 2 of the stator is formed of a plurality of laminations 8 which, with the end parts 4, 6 are held together as a unitary structure by bolts or rivets 10 which extend through aligned openings in the laminations and the heads of which are received in elongated holes 12 formed in the end members 4, 6.

Each of the laminations which form the stator is preferably rectangular in external shape and of unitary construction. The interior of each lamination is stamped out to provide four salient poles having arcuate faces 14 arranged circumferentially whereby an armature of circular cross-section (not shown) may be rotated between them. Each of such salient poles is undercut at each side thereof, leaving a reduced part 16 which is located centrally of the pole and by which the arcuate pole face is attached to the rectangular outer peripheral part 18 of the stator frame, and on each side of which reduced part and behind the arcuate face there is a recess 20.

The coils which must be provided in machines of the type described to set up a magnetic field about the poles are, according to this invention, applied and positioned in a new manner whereby all available space is utilized. As is usual in electric motors a shunt field winding and a series field winding must be provided and, in accordance with the invention, the shunt-field winding is divided into two parts in order to facilitate manufacture and utilize all pace. One of such shunt windings, which is designated 22, is wound about the part 16 of each pole and the opposite sides thereof are positioned within the recesses 20 behind the face of each pole piece. Each winding 22 is made of such size that each of its opposite sides substantially fills one of the recesses 20 whereby the outer edges of the windings are substantially aligned with the opposite longitudinal edges of the curved face of the pole piece. Each coil 22 may be placed in a recess 20 by slipping the coil over the edges of the face of the pole piece and then deforming its side parts into the recesses, thereby slightly elongating the coil. A second part of the shunt coil which is designated 24, is positioned about the coil 22 and may be slipped over that coil and the face of the pole piece. After the two shunt coils 22, 24 are in place the series coil 26 may be placed over the exterior of the outer shunt coil 24. When all of the coils 22, 24, 26 are in place the spaces between adjacent pole pieces will be substantially filled, as shown in Fig. 2 of the drawing.

By this invention I provide means for cooling the stator windings. Such means are disclosed in Figs. 1 and 3 and comprises tubes 30 which are formed of insulating material and which extend longitudinally of the stator from one end thereof to the other, being open at both ends. As stated hereinbefore, the windings 22, 24, 26 substantially fill the spaces between adjacent poles and the tubes 30 are preferably driven between the wires of the adjacent windings 26 after the same are in place. In order to prevent the insulating means of such wires from being broken as the tubes are driven into the winding, the tube is made of a material which is not harder than such insulating material. The insertion of the tubes not only serves to provide passages for cooling air means through the stator windings but also serves to wedge the wires tightly in place behind the faces of the pole pieces.

It will be apparent to those skilled in the art that I have provided by this invention a stator having a minimum number of parts, in which all possible space is utilized, and in which positive means are provided for cooling the stator windings. Although the disclosed embodiment of the invention is a four-pole stator of rectangular external cross-sectional shape, the invention may be applied to stators of any external cross-sectional shape or having any number of poles. While I have described and illustrated only one embodiment of my invention, other embodiments, as well as modifications of that disclosed, will occur to those skilled in the art, all of which may be done without departing in any way from the scope of the invention, for the limits of which reference must be had to the appended claims.

What is claimed is:

1. A stator for an electric motor, comprising a frame member having a continuous peripheral part defining a central opening and having a plurality of pole pieces extending inwardly from the peripheral part, each of said pole pieces having a circumferentially elongated, arcuate face part connected centrally thereof to the peripheral part by a part of less circumferential extent than the face part, whereby a recess is provided on each side of the connecting part behind the face part, and windings coiled about said connecting part and being partially within the recesses behind the face part and substantially filling the space between adjacent pole pieces, and means for ventilating said windings comprising a hollow tube extending longitudinally of the stator and being disposed between the windings of adjacent pole pieces.

2. A stator for an electric motor, comprising a frame member having a continuous peripheral part defining a central opening and having a plurality of pole pieces extending inwardly therefrom, each of said pole pieces having a circumferentially elongated, arcuate face part connected centrally thereof to the closed frame member by a part of less circumferential extent than the face part, whereby a recess is provided on each side of the connecting part behind the face part, and windings coiled about said connecting part and being partially within the recesses behind the face part and substantially filling the space between adjacent pole pieces, and means for ventilating said windings comprising a hollow tube formed of electrically non-conducting material extending longitudinally of the stator between the windings of adjacent pole pieces.

3. A stator for an electric motor comprising a frame member having a continuous peripheral part defining a central opening and having a plurality of pole pieces extending inwardly from the peripheral part, each of said pole pieces having a circumferentially elongated, arcuate face part connected centrally thereof to the peripheral part by a part of less circumferential extent than the face part, whereby a recess is provided on each side of the connecting part behind the face part, and windings coiled about each of said connecting parts and being partially within the recesses behind the face parts and substantially filling the space between adjacent pole pieces, and means providing a passage for cooling air through said windings comprising hollow tubes formed of electrically non-conducting material of no greater mechanical strength than the insulation of the wires of the windings extending longitudinally of the stator between the windings of adjacent pole pieces.

VAINO A. HOOVER.